(12) United States Patent
Colosimo (10) Patent No.: US 10,902,630 B2
(45) Date of Patent: Jan. 26, 2021

(54) PASSIVE SENSE AND AVOID SYSTEM (71) Applicant: BAE Systems plc, London (GB)

(72) Inventor: Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/632,407

(22) PCT Filed: Jul. 31, 2018

(86) PCT No.: PCT/GB2018/052174
§ 371 (c)(1),
(2) Date: Jan. 20, 2020

(87) PCT Pub. No.: WO2019/034836
PCT Pub. Date: Feb. 21, 2019

(65) Prior Publication Data
US 2020/0211215 A1    Jul. 2, 2020

(30) Foreign Application Priority Data

Aug. 14, 2017  (GB) .................................... 1713021.2
Aug. 21, 2017  (EP) .................................... 17187052

(51) Int. Cl.
*G06T 7/70* (2017.01)
*G06T 7/62* (2017.01)
(Continued)

(52) U.S. Cl.
CPC ................ *G06T 7/70* (2017.01); *G01S 11/12* (2013.01); *G06K 9/00791* (2013.01); *G06T 7/10* (2017.01);
(Continued)

(58) Field of Classification Search
CPC ........ G06T 7/70; G01S 11/12; G06K 9/00791
See application file for complete search history.

(56) References Cited

U.S. PATENT DOCUMENTS 3,103,586 A   9/1963  Ovrebo et al.
5,282,013 A   1/1994  Gregoris
(Continued)

FOREIGN PATENT DOCUMENTS

DE  10210260 A1   10/2003
GB  2322985 A    9/1998
WO  2009106037 A1  9/2009

OTHER PUBLICATIONS

PCT Search Report & Written Opinion for Appl No. PCT/US2018/052174 dated Oct. 17, 2018, 15 pages.
(Continued)

*Primary Examiner* — Girumsew Wendmagegn
(74) *Attorney, Agent, or Firm* — Maine Cernota & Rardin (57) ABSTRACT

The present invention provides a method suitable for use in a sense and avoid system of a vehicle having a hyperspectral imaging system, the method comprising: estimating the range to an object from the vehicle, wherein estimating the range comprises: measuring the emission spectrum of the object using the hyperspectral imaging system; identifying at least one trough and/or discontinuity in the emission spectrum by subtracting the measured emission spectrum from a perfect blackbody emission spectrum; and searching a storage means storing spectral radiances and/or wavelengths of troughs and/or discontinuities, each with an associated known atmospheric path length, for the corresponding spectral radiance and/or wavelength of the identified at least one trough and/or discontinuity in order to estimate the atmospheric path length, and consequently the range, between the object and the vehicle. The present invention also provides a sense and avoid system for performing the same method.

19 Claims, 10 Drawing Sheets

(51) Int. Cl.
*G06T 7/10* (2017.01)
*G01S 11/12* (2006.01)
*G06K 9/00* (2006.01)
*G05D 1/10* (2006.01)

(52) U.S. Cl.
CPC .............. *G06T 7/62* (2017.01); *G05D 1/106* (2019.05); *G06T 2207/10036* (2013.01); *G06T 2207/30252* (2013.01)

(56) References Cited

U.S. PATENT DOCUMENTS

| | | | |
|---|---|---|---|
| 5,677,761 A | 10/1997 | Hasson | |
| 6,222,618 B1 * | 4/2001 | Hasson | G01C 3/08 250/339.15 |
| 8,295,548 B2 | 10/2012 | Banerjee et al. | |
| 9,234,618 B1 | 1/2016 | Zhu et al. | |
| 9,665,094 B1 * | 5/2017 | Russell | B64D 47/08 |
| 2007/0045545 A1 | 3/2007 | Light et al. | |
| 2011/0058152 A1 | 3/2011 | Barth | |

OTHER PUBLICATIONS

European Search Report and Written Opinion for Appl No. 17187052.0 dated Feb. 24, 2018, 10 pages.
Great Britain Search Report for Appl No. 1713021.2 dated Feb. 9, 2018, 4 pages.
International Preliminary Report on Patentability for Application No. PCT/GB2018/052174 dated Feb. 18, 2020, 11 pages.

* cited by examiner

PASSIVE SENSE AND AVOID SYSTEM

RELATED APPLICATIONS

This application is a national phase application filed under 35 USC § 371 of PCT Application No. PCT/GB2018/052174 with an International filing date of Jul. 31, 2018, which claims priority of GB Patent Application 1713021.2 filed Aug. 14, 2017 and EP Patent Application 17187052.0 filed Aug. 21, 2017. Each of these applications is herein incorporated by reference in its entirety for all purposes.

FIELD

This specification relates generally to a method for use in a sense and avoid system of a vehicle and a sense and avoid system for performing the same. Particularly, this specification relates to estimating the range to an object.

BACKGROUND

It is known to use radar systems to calculate the range to objects and to classify the objects. However, there are environments where this is not beneficial. For example, radar emissions can give the host platform's position away to an adversary, which is disadvantageous in a combat or infiltration mission. Passive radar systems are known, but these rely on the target objects emitting radiation. Additionally, known radar systems for calculating the range to distant objects are expensive, large, heavy and generally require high power, and so are not ideal for smaller platforms such as unmanned aerial vehicles (UAVs).

Lidar systems are also available. However, these systems are costly to install and operate. Moreover, they lead to very large datasets which are difficult to process.

Therefore, there is a need for a passive and low-cost means for discriminating between objects and calculating the range to those objects such that they can be avoided if necessary.

SUMMARY

According to a first aspect of the present invention, there is provided a method suitable for use in a sense and avoid system of a vehicle having a hyperspectral imaging system, the method comprising:
estimating the range to an object from the vehicle, wherein estimating the range comprises:
measuring the emission spectrum of the object using the hyperspectral imaging system;
identifying at least one trough and/or discontinuity in the emission spectrum; and
searching a storage means storing spectral radiances and/or wavelengths of troughs and/or discontinuities, each with an associated known atmospheric path length, for the corresponding spectral radiance and/or wavelength of the identified at least one trough and/or discontinuity in order to estimate the atmospheric path length, and consequently the range, between the object and the vehicle.

Advantageously, the method allows the range to detected objects to be estimated without the emission from the platform performing the detection being necessary, enabling the platform to remain undetected. Furthermore, the range to the objects can be estimated using a lightweight, relatively small system that does not draw large amounts of power.

The emission spectrum of the object may be measured in the 8 to 12 µm waveband.

The method may further comprise identifying objects by:
capturing a visual image of a scene;
segmenting the image using spectral data from the hyperspectral imaging system; and
classifying each segment of the image by comparing spectral data with stored spectral data associated with clouds, clear sky and terrain in order to identify objects.

The method may further comprise identifying objects by:
capturing a visual image of a scene;
identifying features in the image;
controlling the direction of the hyperspectral imaging system to receive spectral data from each of the features; and
classifying each feature by comparing spectral data with stored spectral data associated with clouds, clear sky and terrain in order to identify objects.

The method may further comprise calculating the size of the object by:
summing the number of pixels occupied by the object in the visual image;
calculating the angle subtended by the object using the number of pixels; and
calculating the size of the object using the angle subtended and the range to the object.

The method may comprise calculating and storing track data for the object, wherein track data comprises at least one of azimuth, elevation and range.

The method may further comprise classifying the type of object based on the size of the object and track data.

The method may comprise controlling the vehicle to change course in accordance with the object type and track data.

The vehicle may be an aircraft.

According to a second aspect of the present invention, there is provided a sense and avoid system for a vehicle comprising:
a hyperspectral imaging system configured to measure the emission spectrum of an object;
a storage means for storing atmospheric path lengths and associated spectral radiances and/or wavelengths of troughs and/or discontinuities in an emission spectrum; and
a controller configured to:
identify at least one trough and/or discontinuity in the measured emission spectrum by subtracting the measured emission spectrum from a perfect blackbody emission spectrum; and
search the storage means for the spectral radiance and/or wavelength of the identified at least one trough and/or the identified at least one discontinuity in order to estimate the atmospheric path length, and consequently the range, between the object and the vehicle.

The sense and avoid system may further comprise a visual imaging system for capturing a visual image of a scene.

The visual imaging system may be a wide field of view stills camera. The sense and avoid system may comprise a sensor unit comprising the visual imaging system and the hyperspectral imaging system.

The sensor unit may further comprise a rotating mirror for directing electromagnetic radiation onto the visual imaging system and the hyperspectral imaging system.

According to a third aspect of the present invention, there is provided an aircraft comprising the sense and avoid system according to the second aspect.

BRIEF DESCRIPTION OF THE DRAWINGS

Embodiments will now be described, by way of non-limiting example, with reference to the accompanying drawings, in which.

DETAILED DESCRIPTION OF EMBODIMENTS

Embodiments herein relate generally to passive electro-optical sense and avoid systems and methods of operating the same. The emission spectrum of an object is received and analysed. The received spectrum is compared with that of a perfect blackbody in order to identify relative troughs and/or discontinuities. The spectral radiance (i.e. intensity at a given wavelength) or wavelength of these troughs and/or wavelengths of discontinuities in the emission spectrum is compared with known trough spectral radiances and/or wavelengths and discontinuity wavelengths at different atmospheric path lengths in order to estimate the atmospheric path length between the object and the platform and in turn estimate the range to the object.

The actual size of the object can then be determined using the range and the number of pixels the object occupies in a visual image. Using the size of the object and other properties such as its velocity and altitude, the object type can then be determined.

The invention will now be explained in more detail with reference to the drawings.

Figure 1A:
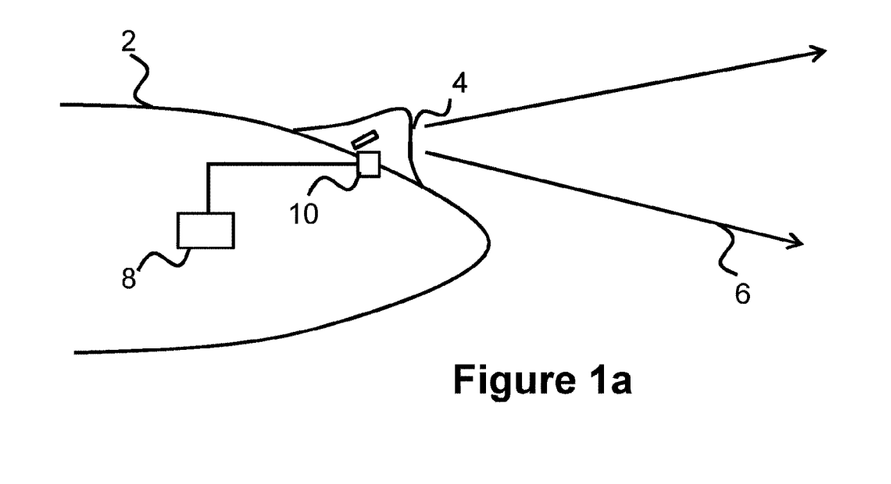
FIG. 1a is a side view of a passive sense and avoid system according to embodiments of the present invention.
Figure 1B:
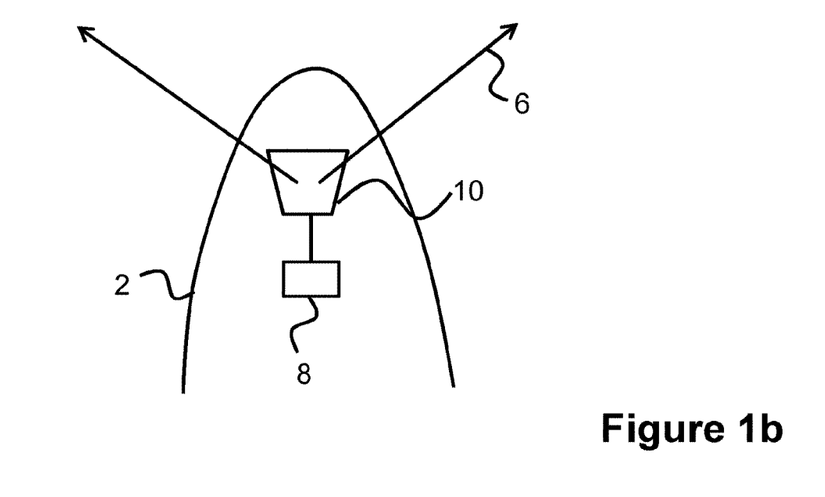
FIG. 1b is a plan view of a passive sense and avoid system according to embodiments of the present invention.

Referring to FIGS. 1a and 1 b, a system is shown for sensing and avoiding objects. The system is incorporated into a vehicle 2. The vehicle 2 shown in FIGS. 1a and 1b is an aircraft, which may be manned or unmanned. In other embodiments, the vehicle 2 is a waterborne or ground-based vehicle such as a driverless car.

The vehicle 2 comprises a navigation system (not shown) for calculating and storing navigation system data. Navigation system data includes the vehicle's 2 current and previous speed, heading, altitude and position. The navigation system includes, for example, a GPS receiver, and altimeter and a compass.

The vehicle 2 has a fairing comprising a window 4 transparent to the hyperspectral waveband of operation and transparent to visible light, through which electromagnetic radiation can be received from objects within the field of regard 6 of a sensor unit 10 (described later with reference to FIG. 2) disposed inside the fairing. In alternative embodiments, two separate windows 4 are provided spaced apart laterally, where one window is transparent to the hyperspectral waveband of operation and the other window is transparent to visible light. The field of regard 6 is preferably greater than 90 degrees in azimuth and 30 degrees in elevation with respect to the direction of travel of the vehicle 2. In some embodiments, the sensor unit 10 is disposed inside the main body of the vehicle 2, rather than in a fairing. In a one embodiment, the sensor unit 10 is situated in the nose of the vehicle 2. In other words, in this embodiment, the window 4 is built into the front of the vehicle 2.

The sensor unit 10 is coupled to a controller 8. In the embodiment shown here, the controller 8 is the main controller for the vehicle 2, and so is integrated in the main body of the vehicle 2 rather than disposed in the fairing. The controller 8 is, for example, a processor, a microprocessor or a microcontroller.

In other embodiments, the controller 8 is integrated with the sensor unit 10. In further embodiments, instead of a fairing, the sensor unit 10 and controller 8 are installed in a pod coupled to the vehicle 2, such as an underwing or under-fuselage pod.

The system further comprises a storage device (not shown). The storage device may be a non-volatile memory such as read only memory (ROM), a hard disk drive (HDD), or a solid state drive (SSD). The storage device stores, amongst other things, a look up table having a list of atmospheric path lengths and respective spectral radiances and/or wavelengths of troughs and wavelengths of discontinuities in emission spectra, navigation system data, and an operating system. The storage device also includes RAM used by the controller 8 for the temporary storage of data. The operating system may contain code which, when executed by the controller 8 in conjunction with RAM, controls operation of each of the hardware components of the passive sense and avoid system.

Figure 2:
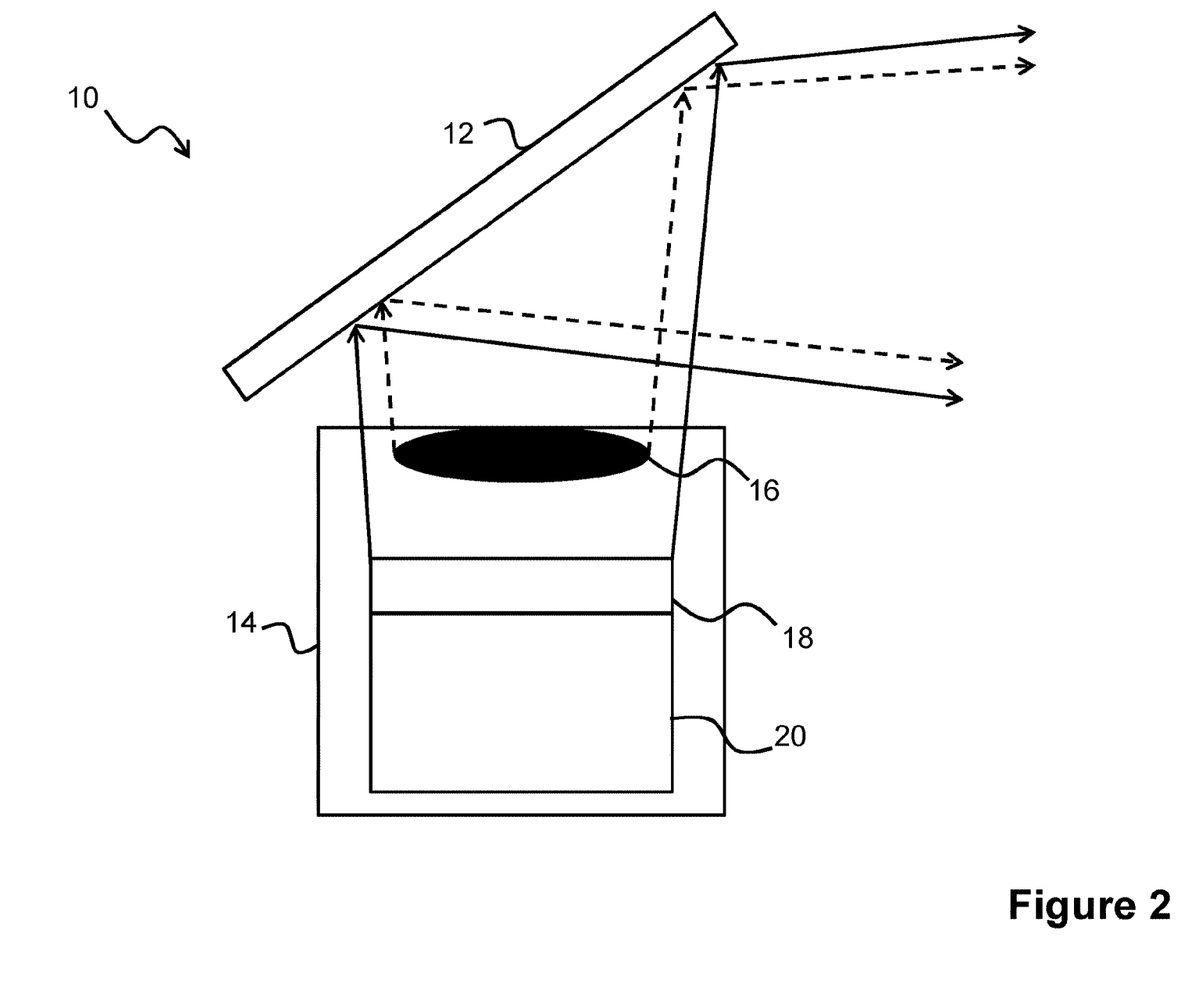
FIG. 2 is a system diagram of a sensor unit shown in FIG. 1.

The sensor unit 10 will now be described in more detail with reference to FIG. 2. The sensor unit 10 comprises a hyperspectral imager 20 having a slit 18, and a high resolution visible-band camera 16 (for example, a wide field of view camera) having a lens assembly. The hyperspectral imager 20 and wide field of view camera 16 are co-located in the same casing 14. The sensor unit 10 also includes a scan mechanism 12 for increasing the field of regard 6 of the sensor unit 10 in the azimuth direction. The scan mechanism 12 includes a reflector coupled to a gimbal for causing it to rotate (or rock). The wide field of view camera 16 is controlled to take three separate images, and the scan mechanism 12 is controlled such that each of the images is taken of a different part of the scene (or environment). Therefore, when stitched together, the images cover a wide field of regard 6, for example, 120 degrees azimuth by 27 degrees elevation. The field of view of the wide field of view camera 16 and the field of view of the hyperspectral imager 20 are boresight aligned so that it is possible to map between pixels in a visual image and pixels in a hyperspectral image. It would be readily appreciated that the field of regard and number of images described herein is by way of example only, and the skilled person would optimise the number of images based on the field of regard that the available equipment is capable of.

Hyperspectral imaging has proved effective at discriminating objects from high clutter backgrounds based on spectral processing techniques. The radiation from any object is comprised of two parts: reflected radiation from the environment and the Sun; and self-emitted radiation from the object itself by virtue of its temperature (also known as Planck emission). How much of each source of radiation that is measured will depend on the waveband that the object is observed in. This is important because if for example the object were observed in the near infrared waveband, what is seen of the object will largely be solar radiation reflected (scattered) off the object and surrounding environment. To avoid this, in some embodiments, the hyperspectral imager 20 is configured to receive and process electromagnetic radiation in the 8 to 12 μm waveband (far band infrared) which is dominated by self-emission given that the Sun does not feature strongly here. Furthermore, the 8 to 12 μm waveband is more heavily attenuated versus other infrared wavebands. Attenuation in this case is advantageous because it: (1) creates valleys and troughs more readily such that the present method can work effectively over short ranges; and (2) subdues environmental radiation which may eventually reflect off the object 100. In other embodiments, the hyperspectral imager 20 is configured to receive and process electromagnetic radiation in the 3 to 5 μm waveband. Generally, the hyperspectral imager 20 is configured to receive and process electromagnetic radiation in any waveband falling between 1.4 μm and 1 m. The hyperspectral imager 20 collects information of a scene across the electromagnetic spectrum, from ultraviolet to long-infrared.

In some embodiments, there is no scan mechanism, and here the field of regard 6 is the smaller of the field of view of the hyperspectral imager 20 and field of view of the wide field of view camera 16.

In further embodiments, separate scan mechanisms 12 are associated with each of the hyperspectral imager 20 and the wide field of view camera 16. This is advantageous where the resolution of the hyperspectral imager 20 is much less than that of the wide field of view camera 16.

The wide field of view camera 16 is, for example a very high megapixel (for example a 16 megapixel) stills camera. Such a camera has a high spatial resolution that is sufficient to spatially detect even very light aircraft at a range of 10 km.

Advantageously, the present invention provides a passive means to differentiate between clear sky, cloud, terrain, and intruder aircraft; detect and track (azimuth, elevation, and range with respect to the vehicle 2) other airspace users and clouds at ranges of 5 km or greater; provide a rate of movement, range and rate of closing estimate; and to identify regions of terrain homogeneity for forced landing scenarios. The solution is a compact, low mass, low power, high reliability system for intruder aircraft detection and tracking and delivers a low false alarm rate.

Figure 3:
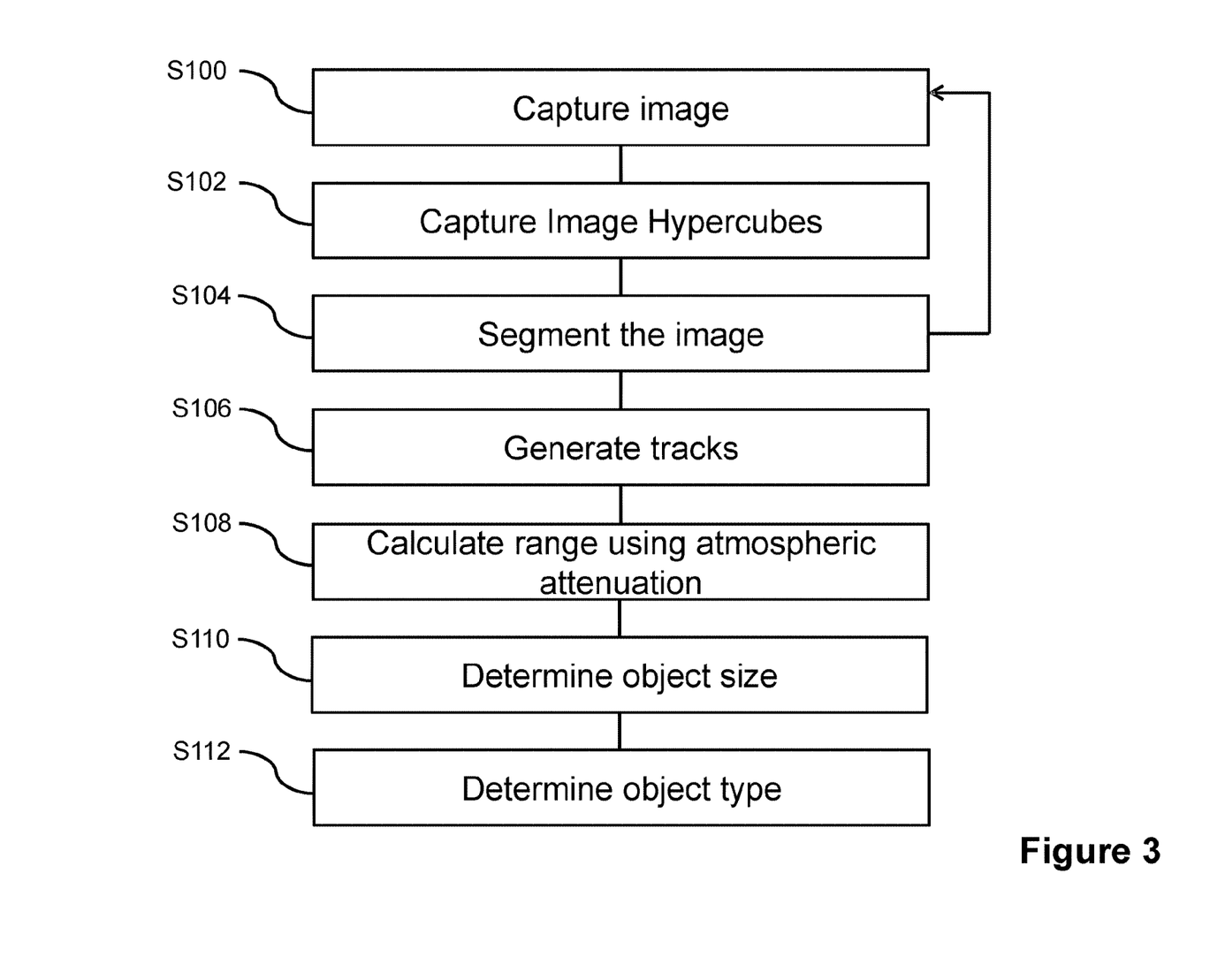
FIG. 3 is a flow diagram showing a method of determining an object type according to embodiments of the present invention.

The process for sensing and avoiding objects will now be described with reference to FIG. 3. In step S100, a visible image is captured at time T1 using a wide field of view camera 16. In some embodiments, a scan mechanism 12 is rotated in front of the wide field of view camera 16 such that a number of images are captured and stitched together to form a panoramic image of a scene. In other words, the sensor unit 10 performs a number of azimuth step stares. This is demonstrated in FIG. 5, and here the vehicle 2 is an aircraft. The scene includes terrain at the lower part, clouds at the top left, open sky at the top right and an object 100 (in this case another aircraft) in the open sky region.

Step S102 occurs simultaneously with Step S100, i.e. at time T1. Here, the hyperspectral imager 20 receives and processes electromagnetic radiation from the scene imaged by the wide field of view camera 16. Similarly to the wide field of view camera 16, the hyperspectral imager 20 may perform a number of azimuth step stares or alternatively may perform a single azimuth line sweep. The hyperspectral image data of the scene is acquired via the hyperspectral imager 20 which comprises a linear array of sensing pixels. The image data for the entire scene is built up by combining scan lines across the scene. The image acquired at each sensing pixel is dispersed using a spectrometer onto a two-dimensional array of detectors via collimating optics and focussing optics and the hyperspectra for each scan line are then stacked to form a three-dimensional hyperspectral data cube (or hypercube). A hypercube consists of a set of images layered on top of one another. Each image represents one particular wavelength band. Thus in a hyperspectral image, each pixel consists of a spectrum over an appropriate spectral region. Every object has a unique characteristic across these different wavelength bands. This unique characteristic is referred to its 'spectral signature'.

Figure 5:
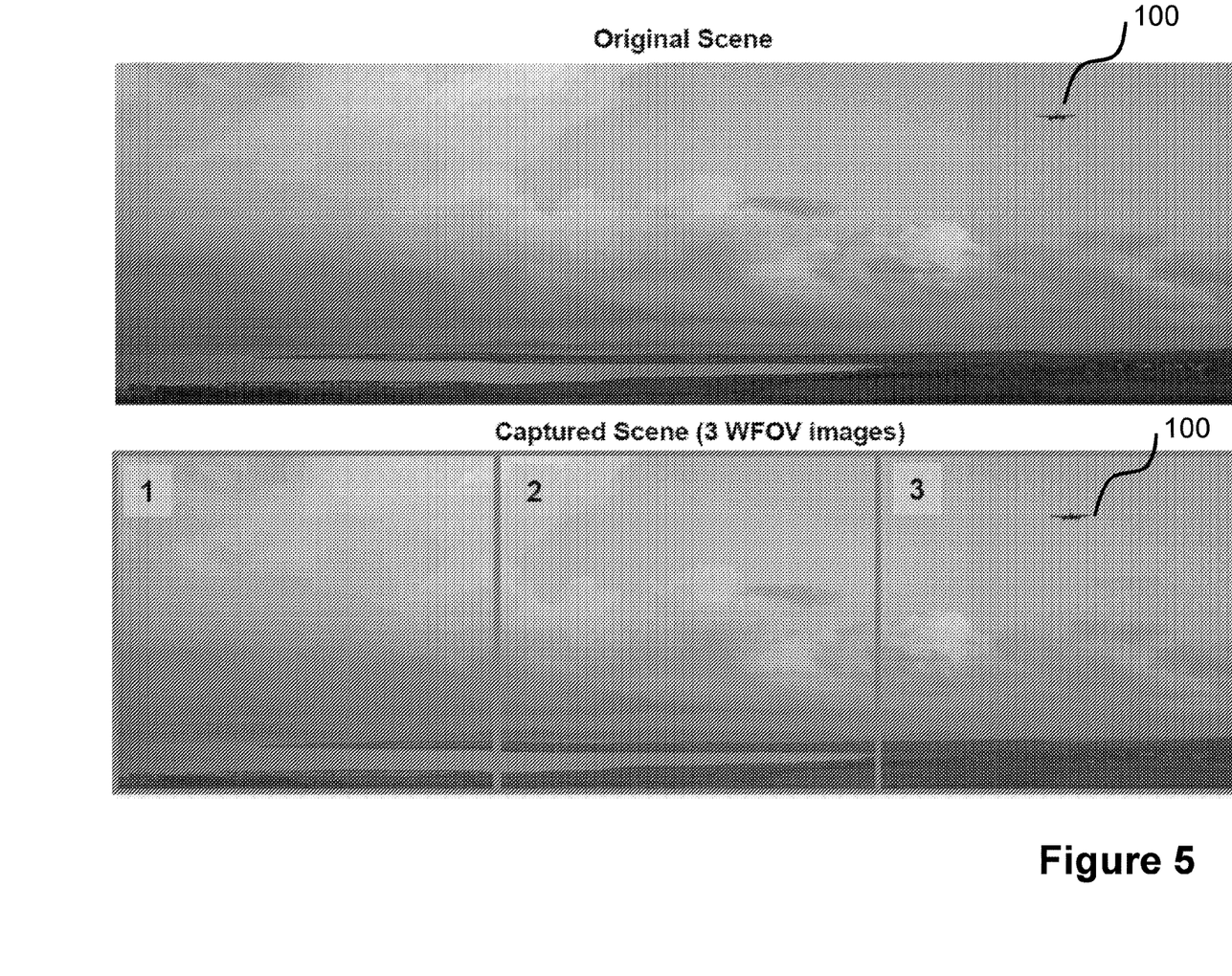
FIG. 5 is a visual image of a scene having an object to be avoided.
Figure 6:
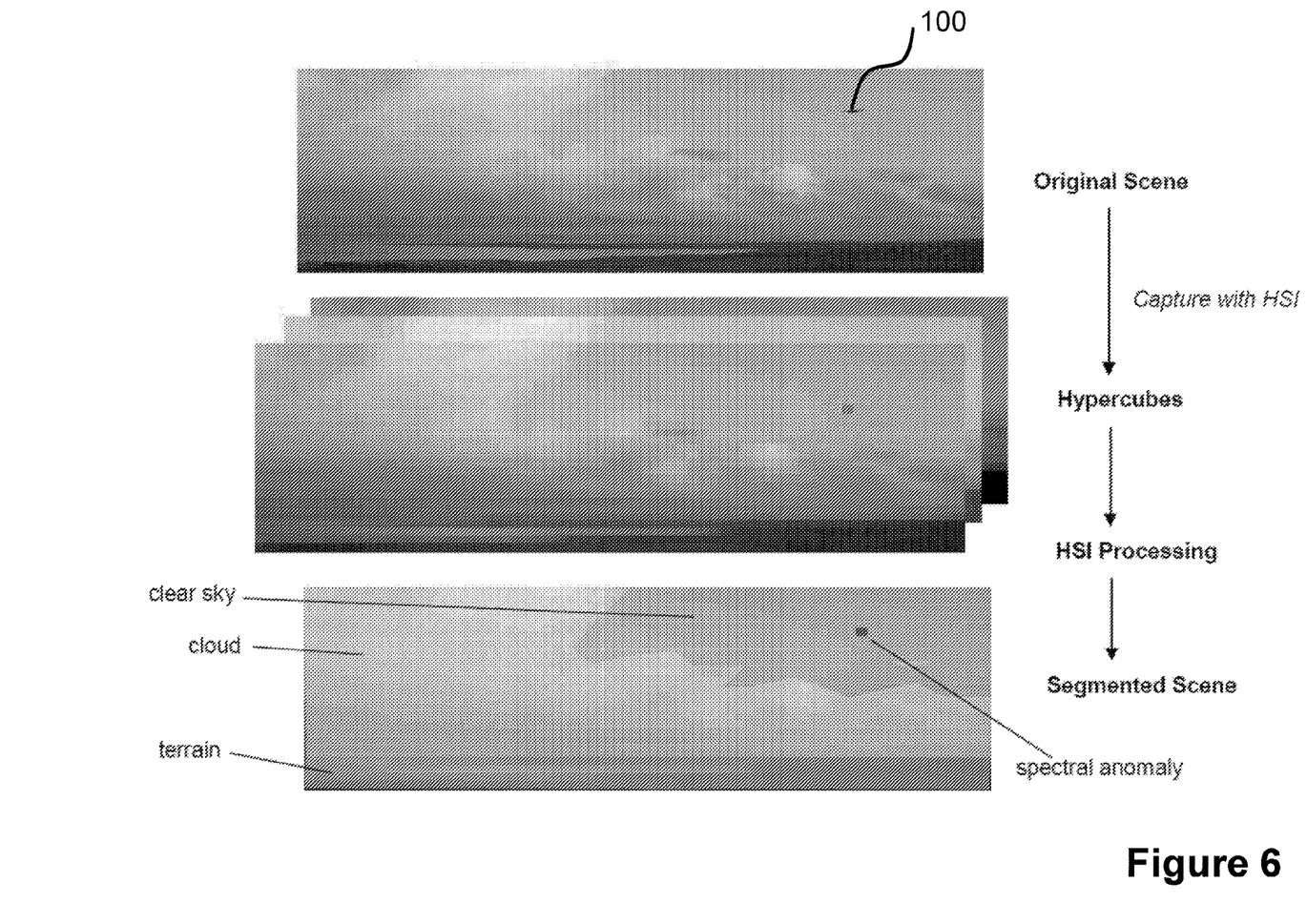
FIG. 6 shows how the image of FIG. 5 is segmented using hyperspectral imaging.

Steps S102 and S104 are demonstrated in FIG. 6. Here, the same scene as in FIG. 5 is divided into hypercubes. In step S104, as shown in the lower frame of FIG. 6, the image is segmented into different regions. Each region represents a different type of scene feature, for example, terrain, open sky, cloud and "other". For example, the lower part of the image is separated from the left hand side of the image, which in turn is separated from the top right side of the image, which in turn is separated from an anomaly at the location of the object 100. This is achieved using hyperspectral imaging anomaly detection or matched filtering algorithms. An example of a matched filtering algorithm is a bloodhound algorithm.

Looking for regions of homogeneity (like sky, clouds, or terrain) would normally be conducted by a spectral change detection algorithm. This is normally used to detect inconsistencies from the same scene measured at different times but may also be used across the hypercube to determine regions of similar spectral radiance allowing the segmentation to occur. Anomalies can be found by this method but these may get washed out so a Spectral Anomaly Detection algorithm would be used to find pixels that stand out. Matched filtering can also be applied but here the target signature must be known to the system so this relies on a database being available. In some embodiments, a combination of all three is used to achieve the desired segmentation and target detection.

At least step S100 is then repeated at time T2. In other words, a second visual image is captured after a short time interval (for example, less than 1 second). By comparing the first and second visual images, it can be determined if any features of the scene have moved between time T1 and T2.

Figure 7:
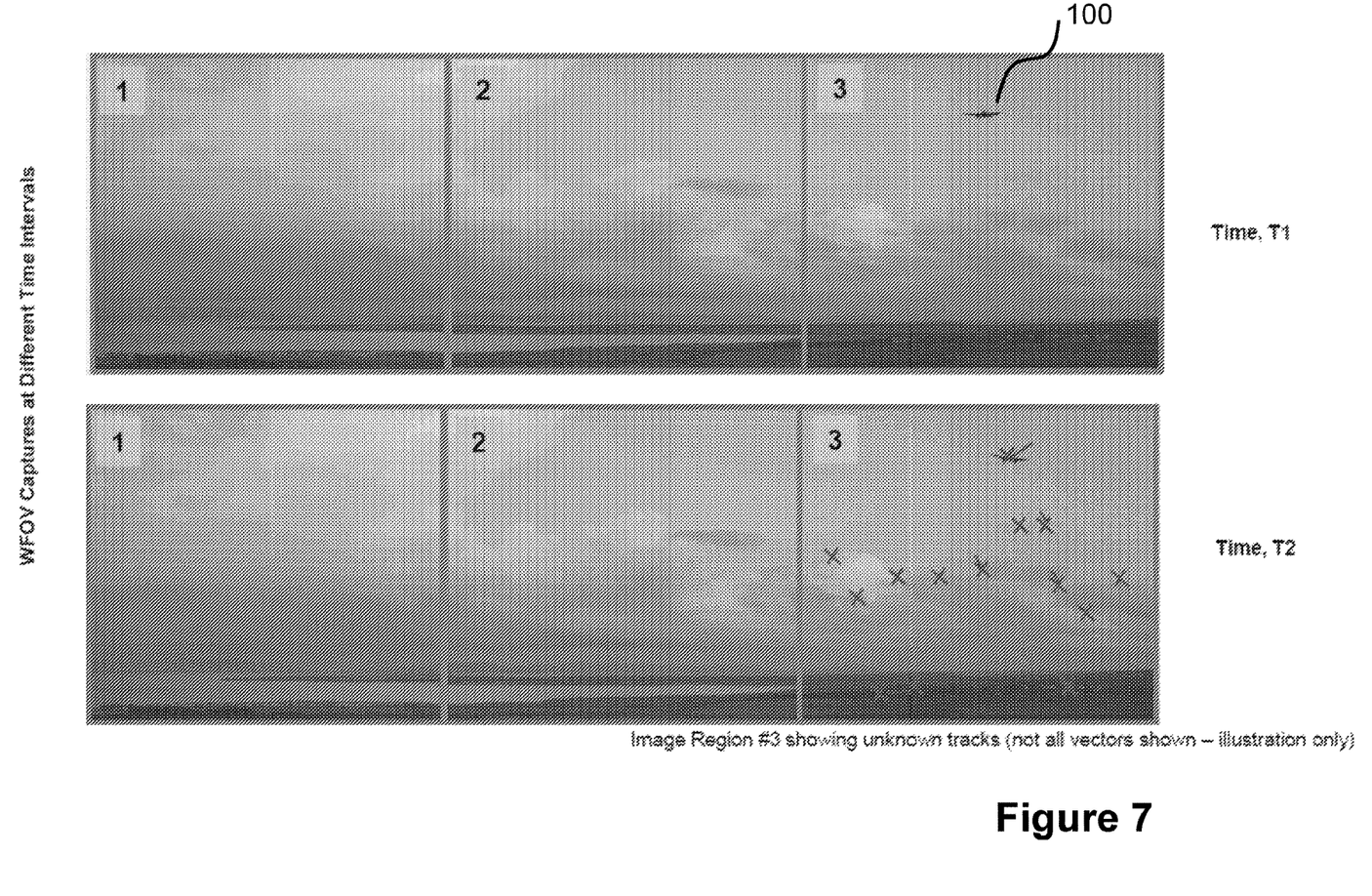
FIG. 7 shows tracks in the image of FIG. 5.
Figure 8:
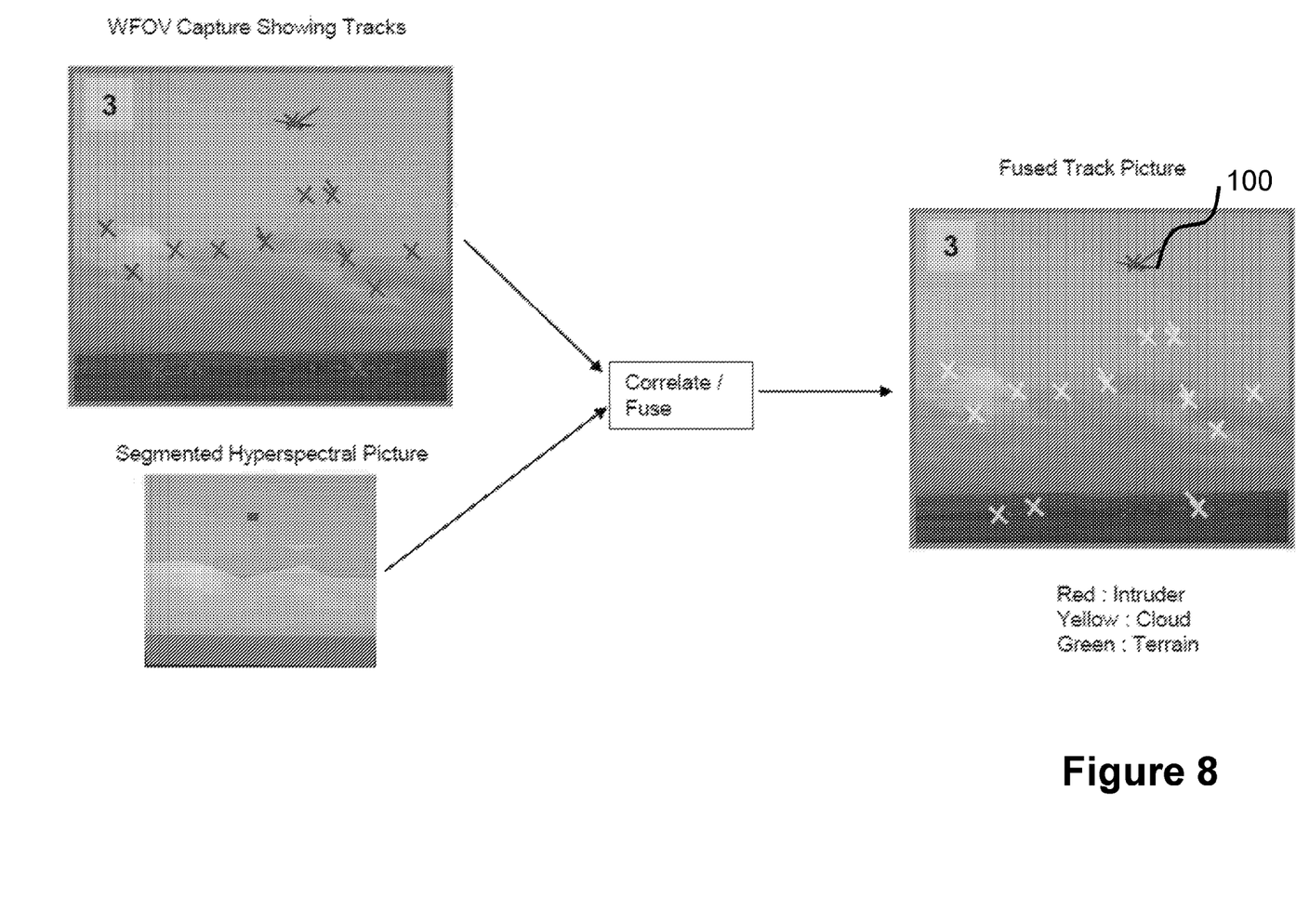
FIG. 8 is a process diagram showing how the tracks in the image of FIG. 7 are classified.

In step S106, and as shown in FIG. 7, tracks in the visual image are generated. These tracks are represented by crosses. The tracks are generated by applying a detection and tracking algorithm (such as optical flow or a multiple hypotheses tracker) to the two visual images to determine if any features have moved between time T1 and T2, and if so, determine their velocities. As shown in FIG. 8, the positions of the tracks are then correlated with the positions of segments in the first image. In other words, the visual image having the applied tracks is fused with the segmented hyperspectral image. This allows the tracks to be classified. For example, tracks are classified as one of terrain, open sky, clouds, and "other", where "other" tracks, by process of elimination, do not fit into the three former categories. The "other" track, in this case, represents an object 100 such as an intruder aircraft.

Step S108 will now be described with reference to FIGS. 4a-d and FIG. 9. In step S108, the range from the vehicle 2 to the object 100 represented by the "other" track, i.e. the intruder aircraft, is estimated using the hyperspectral image data.

Figure 4A:
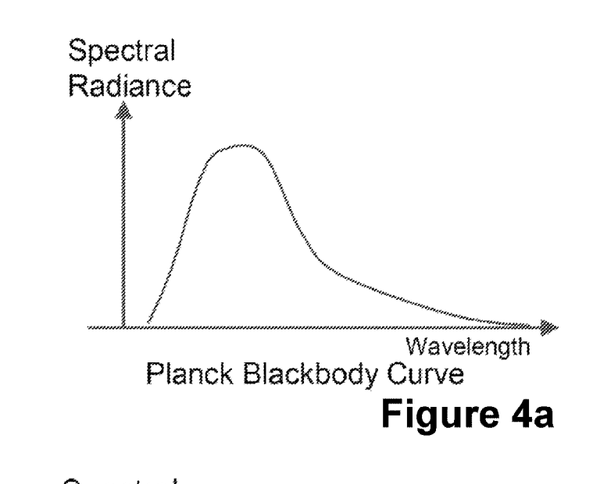
FIGS. 4a to 4d show the effect of increasing distance on a blackbody spectrum.
Figure 4B:
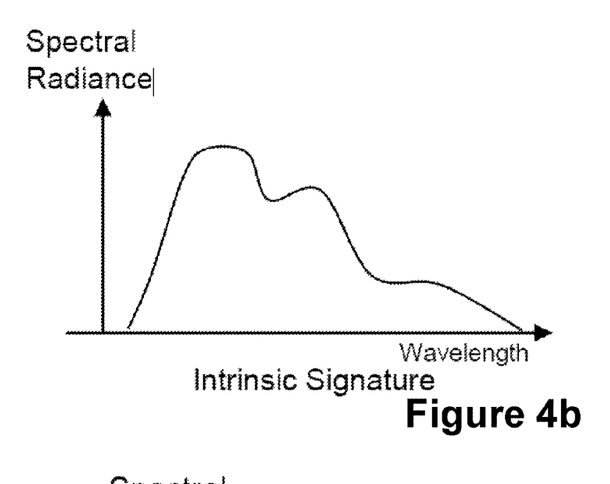
Figure 4C:
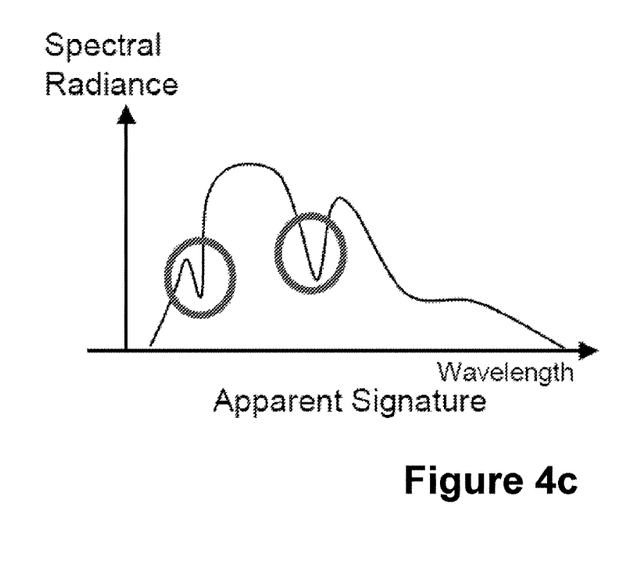
Figure 4D:
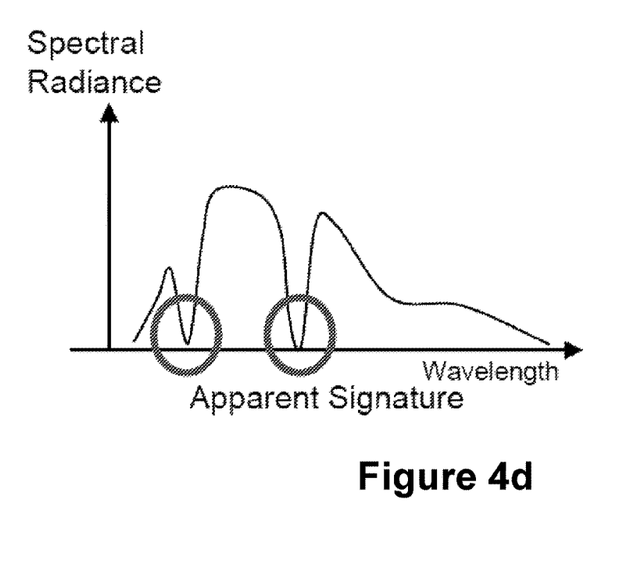

Hard body self-emitting radiation as measured at the object 100 (i.e. with no attenuation) is termed the intrinsic signature. The intrinsic signature, shown in FIG. 4b, has a continuous emission spectra formed from the summation of a series of Planck blackbody curves. As the observer range increases (i.e. as the vehicle 2 moves away from the object) this continuous emission spectra starts to show signs of atmospheric attenuation in the form of troughs or valleys. This is shown in FIG. 4c, where the troughs are circled. Eventually, at longer ranges, discontinuities develop in the emission spectra, as shown in FIG. 4d.

Figure 9:
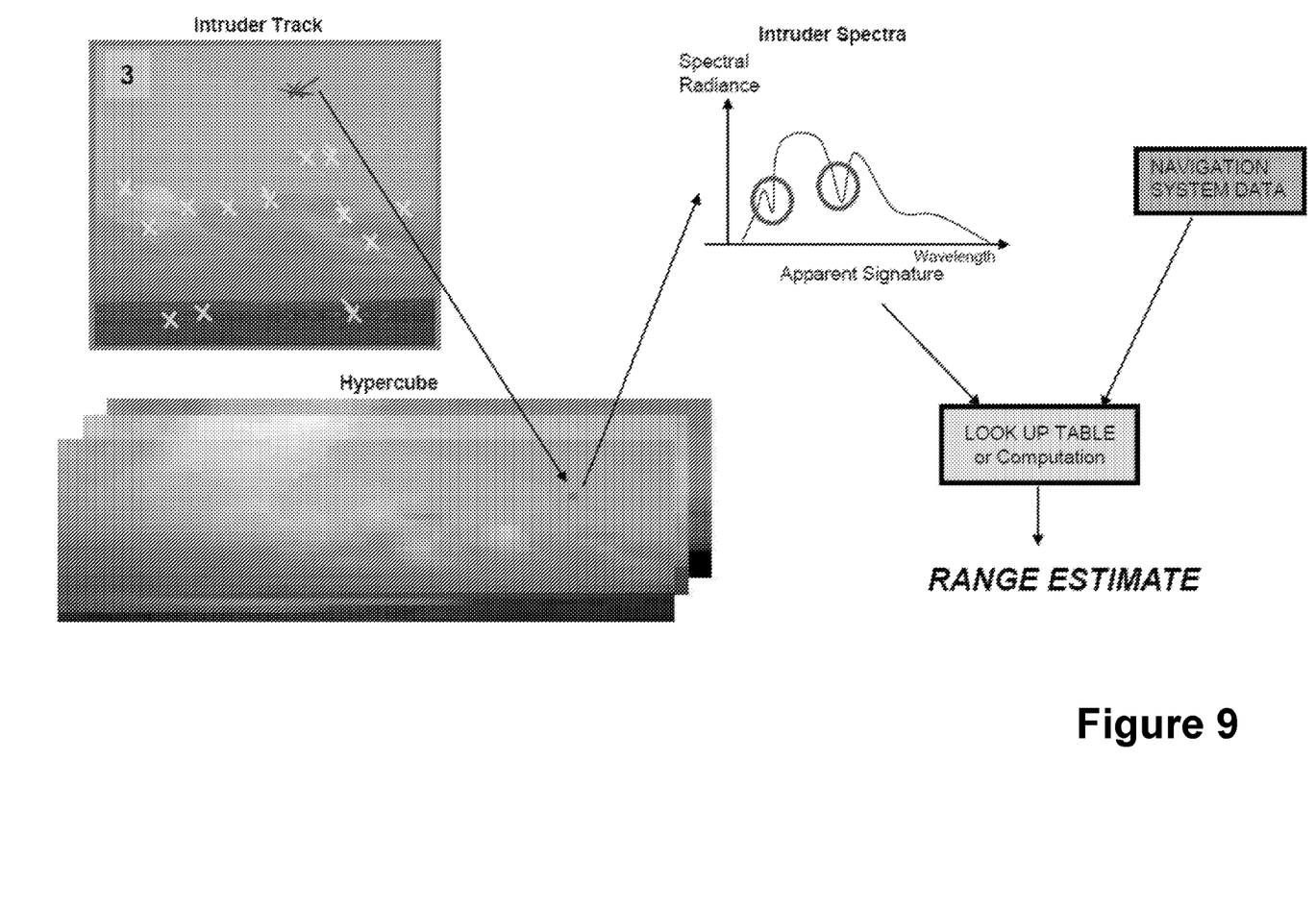
FIG. 9 is a process diagram showing how the visual image and hyperspectral imaging are used to calculate the range to an object.

In step S108, the appearance of these troughs or discontinuities is correlated with the atmospheric path length, and thus range can be determined approximately. To identify the troughs or discontinuities, the measured emission spectra of the object a curve that ignores the emerging troughs is fitted to the measured emission of spectra of the object (i.e. the hypercube associated with the "other" category identified in step S106). The wavelength and/or spectral radiance of the troughs and discontinuities, which are horizontal and vertical changes in the fitted curve, are compared with those known to be associated with different atmospheric path lengths. In other words, the wavelength and/or spectral radiances of the troughs and discontinuities are searched in a look up table or database in order to determine the atmospheric path length. If an identical spectral radiance or wavelength to the measured spectral radiance or wavelength is not present in the look up table, the spectral radiance or wavelength that is closest to that in the measured emission spectra is selected for use in calculating the range. Range to the object 100 is then estimated using the atmospheric path length, path angle and altitude of the vehicle 2. The path angle and altitude are known from the navigation system of the vehicle 2.

Figure 10:
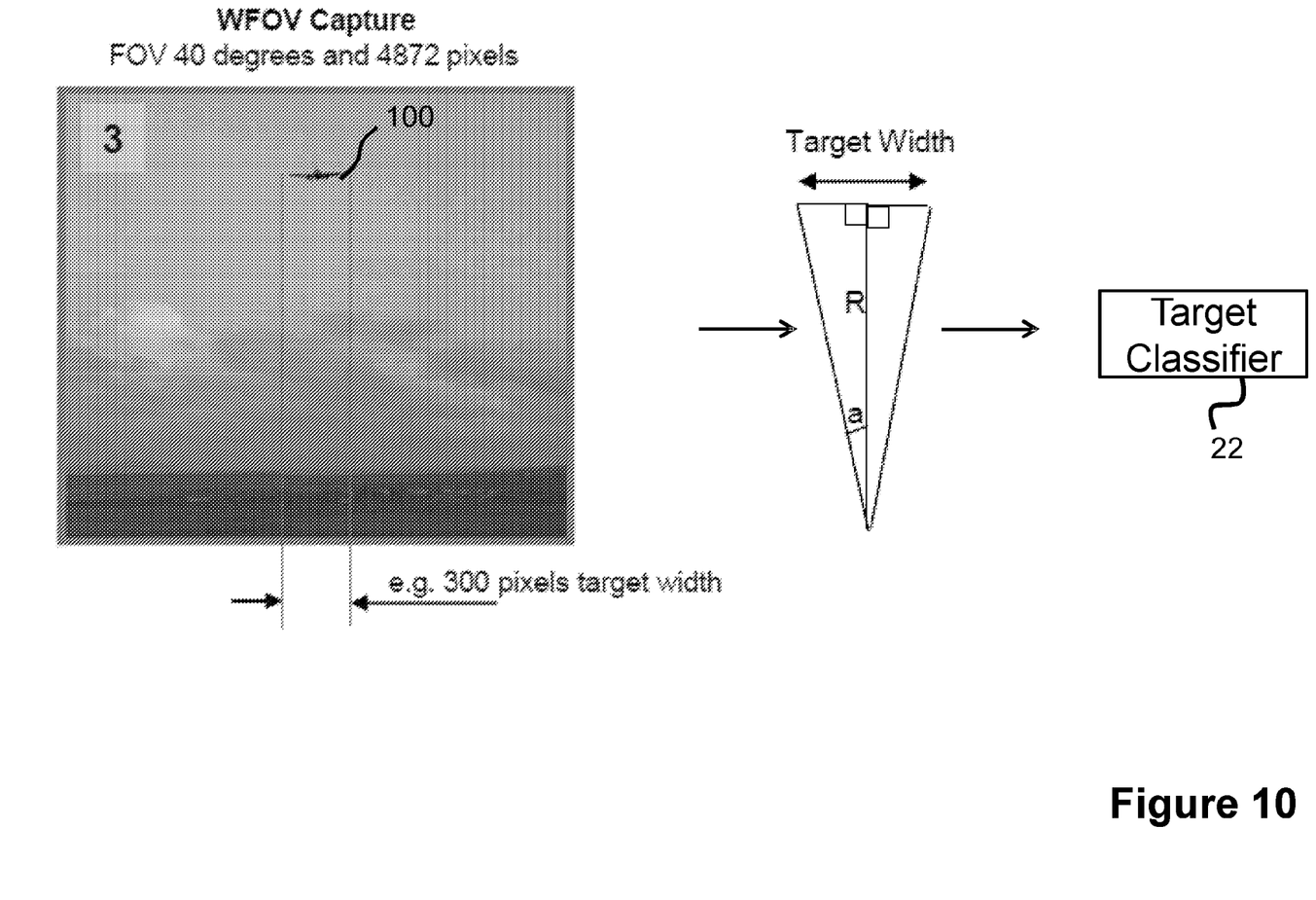
FIG. 10 is a process diagram showing how an intruder is classified according to embodiments of the present invention.

Step S110 will now be described with reference to FIG. 10. Here, the object 100 size is determined using a stadiametric ranging technique. This is achieved by first counting the number of pixels occupied by the object 100 in the visual image. The angle subtended between the object 100 and the vehicle 2 is calculated using trigonometry with the value for range estimated in step S108 and the number of pixels occupied by the target in the visual image. Once the angle subtended is known, the actual width of the target can be calculated.

In step S112, the target type (or, in other words, object type) is determined using a target classifier 22. The target classifier 22 is a software module stored in the storage device for execution by the controller 8. In other embodiments, the target classifier 22 is a standalone device having its own controller. The target classifier 22 uses a look up table to determine the target type. Track data, such as azimuth, range, elevation and size (as calculated in step S110) is correlated with known target types having known attributes falling in the same set as the track data in the look up table. Target type could be, for example, one of light aircraft, balloon, fighter aircraft, commercial airliner, small boat, or ship.

In alternative embodiments, alternatively to steps S102 and S104 described above, the hyperspectral imaging system 20 is physically targeted or slaved to each of the tracks (generated in step S106) in turn in order to determine which category the track belongs to rather than sweeping the whole sky region. These embodiments are advantageous in systems having low resolution hyperspectral imaging systems 20.

Once the target type is determined in step S112, the controller 8 is able to instruct the navigation system of the vehicle 2 to plot a new course to avoid the vehicle 2 coming within a predetermined distance of the object 100. This is achieved using the navigation data of the vehicle 2 (i.e. at least the vehicle's 2 course and speed) and the track data associated with the object 100. Additionally, or alternatively, the target type can be used in the course adjustment process. For example, if the vehicle 2 is an aircraft, and the object 100 is a ship, it can be automatically determined that no course adjustment is necessary.

It should be noted that certain of the process steps depicted in the flowchart of FIG. 3 and described below may be omitted or such process steps may be performed in differing order to that presented above and shown in FIG. 3. For example, the vehicle 2 can be controlled to avoid an object 100 based simply on the range to the object 100, the speed and heading of the object 100 and the speed and heading of the vehicle 2 if the object 100 and vehicle 2 are on the same plane. In other words, at least steps S110 and S112 are advantageous but not essential for the purpose of sensing and avoiding an object 100. Furthermore, although all the process steps have, for convenience and ease of understanding, been depicted as discrete temporally-sequential steps, nevertheless some of the process steps may in fact be performed simultaneously or at least overlapping to some extent temporally. Furthermore, the process steps may be performed continuously.

The system and method according to the present invention, as described above, is passive and so does not alert any adversaries to the vehicle's 2 presence. The solution is not complex, requiring only a sensor unit 10, controller 8 and integration with the vehicle's 2 navigation system. Therefore, the solution may be standalone (i.e. a bolt on, or a podded solution) or fully integrated with the vehicle 2.

Advantageously, the passive sense and avoid system described above has a small Size, Weight, and Power (SWaP) footprint which is important for incorporating the functionality onto aircraft or other small vehicles. The solution described above is also inexpensive when compared with radar systems.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method suitable for use in a sense and avoid system of a vehicle having a hyperspectral imaging system, the method comprising:
   estimating the range to an object from the vehicle; and
   identifying the object,
   wherein estimating the range to the object from the vehicle comprises:
      measuring the emission spectrum of the object using the hyperspectral imaging system;
      identifying at least one trough and/or discontinuity in the emission spectrum; and searching a non-transitory computer-readable storage medium storing spectral radiances and/or wavelengths of troughs and/or discontinuities in an emission spectrum, each with an associated known atmospheric path length, for the corresponding spectral radiance and/or wavelength of the identified at least one trough and/or discontinuity in order to estimate the atmospheric path length, and consequently the range, between the object and the vehicle, and wherein identifying the object comprises:
capturing a visual image of a scene;
segmenting the image using spectral data from the hyperspectral imaging system; and
classifying each segment of the image by comparing spectral data with stored spectral data associated with clouds, clear sky and terrain.

2. The method of claim 1, wherein the emission spectrum of the object is measured in the 8 to 12 μm waveband.

3. The method according to claim 2, further comprising identifying objects by:
capturing a visual image of a scene;
segmenting the image using spectral data from the hyperspectral imaging system; and
classifying each segment of the image by comparing spectral data with stored spectral data associated with clouds, clear sky and terrain in order to identify objects.

4. The method according to claim 2, further comprising identifying objects by:
capturing a visual image of a scene;
identifying features in the image;
controlling the direction of the hyperspectral imaging system to receive spectral data from each of the features; and
classifying each feature by comparing spectral data with stored spectral data associated with clouds, clear sky and terrain in order to identify objects.

5. The method according to claim 1, further comprising calculating the size of the object by: summing the number of pixels occupied by the object in the visual image; calculating the angle subtended by the object using the number of pixels; and calculating the size of the object using the angle subtended and the range to the object.

6. The method according to claim 5, comprising calculating and storing track data for the object, wherein track data comprises at least one of azimuth, elevation and range.

7. The method according to claim 1, comprising calculating and storing track data for the object, wherein track data comprises at least one of azimuth, elevation and range.

8. The method according to claim 7, further comprising classifying the type of object based on the size of the object and track data.

9. The method according to claim 8, comprising controlling the vehicle to change course in accordance with the object type and track data.

10. The method according to claim 1, wherein the vehicle is an aircraft.

11. The method according to claim 1, further comprising calculating the size of the object by: summing the number of pixels occupied by the object in the visual image; calculating the angle subtended by the object using the number of pixels; and calculating the size of the object using the angle subtended and the range to the object.

12. The method according to claim 1, comprising calculating and storing track data for the object, wherein track data comprises at least one of azimuth, elevation and range.

13. A sense and avoid system for a vehicle comprising:
a hyperspectral imaging system configured to measure the emission spectrum of an object;
an imager configured to capture a visual image of a scene;
a non-transitory computer-readable storage medium for storing atmospheric path lengths and associated spectral radiances and/or wavelengths of troughs and/or discontinuities in an emission spectrum; and
a controller configured to:
identify an object by:
capturing a visual image of a scene using the imager;
segmenting the visual image using spectral data from the hyperspectral imaging system OR identifying features in the image;
classifying each feature or segment of the image by comparing spectral data associated with the feature or segment with stored spectral data associated with clouds, clear sky and terrain; and
estimate the range to the object by:
identifying at least one trough and/or discontinuity in the measured emission spectrum by subtracting the measured emission spectrum from a perfect blackbody emission spectrum; and
searching the non-transitory computer-readable storage medium for the spectral radiance and/or wavelength of the identified at least one trough and/or the identified at least one discontinuity in order to estimate the atmospheric path length, and consequently the range, between the object and the vehicle.

14. The sense and avoid system according to claim 13, further comprising a visual imaging system for capturing a visual image of a scene.

15. The sense and avoid system according to claim 14, wherein the visual imaging system is a wide field of view stills camera.

16. The sense and avoid system according to claim 14, comprising a sensor unit comprising the visual imaging system and the hyperspectral imaging system.

17. The sense and avoid system according to claim 16, wherein the sensor unit further comprises a rotating mirror for directing electromagnetic radiation onto the visual imaging system and the hyperspectral imaging system.

18. An aircraft comprising the sense and avoid system according to claim 13.

19. A method suitable for use in a sense and avoid system of a vehicle having a hyperspectral imaging system, the method comprising:
estimating the range to an object from the vehicle; and
identifying the object,
wherein estimating the range to the object from the vehicle comprises:
measuring the emission spectrum of the object using the hyperspectral imaging system;
identifying at least one trough and/or discontinuity in the emission spectrum; and
searching a storage means non-transitory computer-readable storage medium storing spectral radiances and/or wavelengths of troughs and/or discontinuities in an emission spectrum, each with an associated known atmospheric path length, for the corresponding spectral radiance and/or wavelength of the identified at least one trough and/or discontinuity in order to estimate the atmospheric path length, and consequently the range, between the object and the vehicle, and wherein identifying the object comprises:
  capturing a visual image of a scene;
  identifying features in the image;
  controlling the direction of the hyperspectral imaging system to receive spectral data from each of the features; and
  classifying each feature by comparing spectral data with stored spectral data associated with clouds, clear sky and terrain in order to identify objects.

* * * * *